No. 671,986. Patented Apr. 16, 1901.
B. WAKEMAN.
ARMOR FOR PNEUMATIC TIRES.
(Application filed Sept. 12, 1900.)
(No Model.)
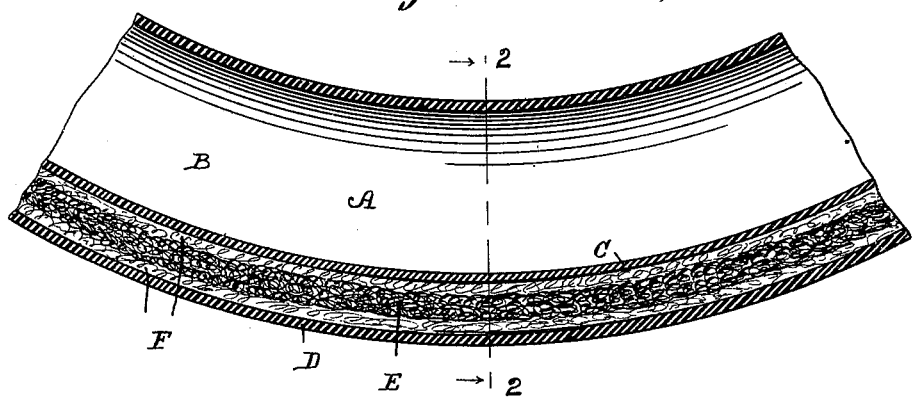
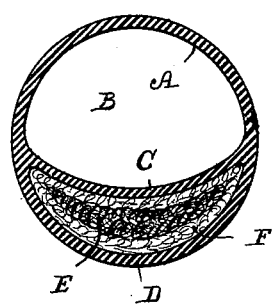
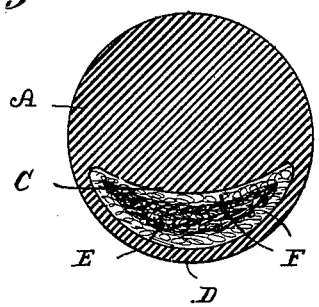
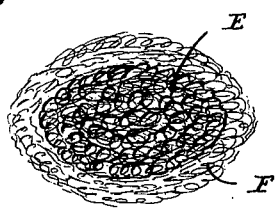
Witnesses
R. H. Newman
W. V. Devitt
Inventor
Bacon Wakeman
By Chamberlain & Newman
Attorneys

UNITED STATES PATENT OFFICE.

BACON WAKEMAN, OF FAIRFIELD, CONNECTICUT.

ARMOR FOR PNEUMATIC TIRES.

SPECIFICATION forming part of Letters Patent No. 671,986, dated April 16, 1901.

Application filed September 12, 1900. Serial No. 29,840. (No specimens.)

*To all whom it may concern:*

Be it known that I, BACON WAKEMAN, a citizen of the United States, and a resident of Fairfield, in the county of Fairfield and State of Connecticut, have invented certain new and useful Improvements in Armors for Pneumatic Tires, of which the following is a specification.

My invention relates to improvements in armors for tires such as are commonly used for bicycles, automobiles, and similar vehicles, and is equally applicable to either the pneumatic or solid-rubber tire types.

It is the object of my invention to provide as nearly as possible a non-puncturable armor for tires and also to insure resiliency and elasticity thereto.

In the carrying out of my invention I employ two materials especially arranged with relation to each other, one of which, properly speaking, constitutes the armor or non-puncturable portion and the other the resilient material, which gives life and durability to the entirety.

It is therefore the purpose of my invention to improve upon devices of the above class by providing a resilient non-puncturable tire-armor which substantially consists of an outer layer of non-puncturable fibrous material, such as cotton, and an inner or intermediate core of a more resilient and durable substance, such as metal wire-wool, as will later be more fully explained.

With the above object in view my invention resides and consists in the novel construction of a tire, as shown upon the accompanying sheet of drawings, forming a part of this specification, upon which similar letters of reference denote like or corresponding parts throughout the several figures, and of which—

Figure 1 shows a central vertical longitudinal section throughout a portion of a tire fitted with my improved armor. Fig. 2 is a central vertical cross-section on line 2 2 of Fig. 1. Fig. 3 is a similar cross-section through a solid rubber tire fitted with my cushioned armor, and Fig. 4 is an enlarged detail sectional view illustrating the materials comprising the armor.

In a previous application filed by me on December 23, 1899, Serial No. 741,488, I have shown, described, and claimed an armor formed of metal wire-wool and cotton, which in a measure accomplishes the object sought after in this invention and is a perfectly practicable and desirable tire. In said application the wire-wool, however, is placed upon the inside and the cotton upon the outer or tread side, thus constituting an inner layer of wire-wool and an outer layer of cotton. My present invention, therefore, is an improvement upon that tire as well as upon the art generally to which it belongs, as will now be more fully explained.

Referring in detail to the characters of reference marked upon the drawings, A indicates the tire as a whole; B, the air-chamber, as indicated in Figs. 1 and 2; C, the wall dividing said air-chamber from the armor, and D indicates the tread of a tire. The armor, as before stated, comprises the combined application of metal wire-wool and fibrous material when employed, as herein shown, in the form of a core E, of wire-wool, and a surrounding layer of cotton F. In practice these armors are made up substantially as shown in Fig. 4 and are then molded with the tire and the armor-chamber between the walls C and D, as indicated in the drawings.

The purpose of my special arrangement in materials, as shown in this application, is to overcome a serious objection which is apparent in tires using an armor of metal wire-wool alone or wherein the wire-wool is exposed to the tire upon any side. In practice the wire-wool is very elastic and will stand a great deal of compression and usage and still retain the desired amount of elasticity and life, which tends to retain the two walls of the tire at a desired distance apart, yet after continued long usage and exposure of the tire to the heat of the sun or very hot pavements the wire will in part become broken or pulverized. When in this condition, it is liable to penetrate or wear out the walls of the tire more or less in accordance with the length of said particles, their position in the tire, and other minor circumstances. It will therefore be apparent that by employing a covering for the wire-wool such as I have indicated in this case—namely, of cotton—in the first place the life of the wool is enhanced, since it is protected and not exposed to the tire and the elements surrounding it and will thus not crystallize and break so quickly. Furthermore, if it should break, the cotton covering will hold it in place and prevent it from engaging and injuring the tire.

It will be obvious, of course, that after a little usage cotton will become packed and then in character is very similar to felt and in a measure acts somewhat in the same manner as against the attempted penetration of a pointed instrument. When so packed, the fibers are very closely intermingled and in a way which resists penetration more quickly than any form of woven material.

Having thus described my invention, what I claim, and desire to secure by Letters Patent, is—

1. An armor for vehicle-tires comprising a core composed of metal wire-wool and a surrounding layer of fibrous material.

2. In an armor for pneumatic tires, the combination of a tubular fibrous cotton material with a central filling of metal wire-wool.

3. In a pneumatic tire the combination with an air-chamber, of an armor comprising fibrous cotton with a central filling of wire-wool.

4. An armor for pneumatic tires comprising resilient wire-wool with a covering of fibrous cotton upon both the back and front sides thereof.

Signed at Bridgeport, in the county of Fairfield and State of Connecticut, this 11th day of September, A. D. 1900.

BACON WAKEMAN.

Witnesses:
  C. M. NEWMAN,
  ELBERT O. HULL.